(12) United States Patent
Maeda et al.

(10) Patent No.: US 10,601,019 B2
(45) Date of Patent: Mar. 24, 2020

(54) ENERGY STORAGE DEVICE

(71) Applicant: GS Yuasa International Ltd., Kyoto-shi (JP)

(72) Inventors: Kazuto Maeda, Kyoto (JP); Hirokazu Kambayashi, Kyoto (JP); Shohei Yamao, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 177 days.

(21) Appl. No.: 15/697,245

(22) Filed: Sep. 6, 2017

(65) Prior Publication Data

US 2018/0069227 A1    Mar. 8, 2018

(30) Foreign Application Priority Data

Sep. 8, 2016   (JP) ................................ 2016-175661
Aug. 22, 2017  (JP) ................................ 2017-159108

(51) Int. Cl.
| | |
|---|---|
| *H01M 2/30* | (2006.01) |
| *H01M 2/04* | (2006.01) |
| *H01M 2/06* | (2006.01) |
| *H01M 2/22* | (2006.01) |
| *H01M 10/04* | (2006.01) |
| *H01M 10/0525* | (2010.01) |

(52) U.S. Cl.
CPC ........... *H01M 2/30* (2013.01); *H01M 2/0473* (2013.01); *H01M 2/06* (2013.01); *H01M 2/22* (2013.01); *H01M 10/0431* (2013.01); *H01M 10/0525* (2013.01); *H01M 2220/20* (2013.01)

(58) Field of Classification Search
CPC ............ H01M 2/02; H01M 2/30; H01M 2/04; H01M 2/06
See application file for complete search history.

(56) References Cited

U.S. PATENT DOCUMENTS

| | | | |
|---|---|---|---|
| 2003/0228518 A1* | 12/2003 | Marple ................... | H01M 4/06 429/221 |
| 2006/0073382 A1 | 4/2006 | Urano et al. | |
| 2011/0200870 A1 | 8/2011 | Kim et al. | |
| 2013/0309559 A1* | 11/2013 | Shiraishi ............. | H01M 2/0473 429/179 |
| 2013/0330602 A1* | 12/2013 | Tsutsumi ............... | H01G 11/70 429/179 |

FOREIGN PATENT DOCUMENTS

| | | |
|---|---|---|
| JP | 2005-340048 A | 12/2005 |
| JP | 2006-100097 A | 4/2006 |
| JP | 2009-087722 A | 4/2009 |
| JP | 2009-087727 A | 4/2009 |
| JP | 2009-289589 A | 12/2009 |
| JP | 2011-165643 A | 8/2011 |
| JP | 2012-221911 A | 11/2012 |
| JP | 2014-241206 A | 12/2014 |
| JP | 2015-005456 A | 1/2015 |

* cited by examiner

*Primary Examiner* — Kenneth J Douyette
(74) *Attorney, Agent, or Firm* — McGinn I.P. Law Group, PLLC.

(57) ABSTRACT

An energy storage device including: an electrode assembly having a body portion and a first tab portion projecting from the body portion; and a container housing the electrode assembly, wherein a first current collector electrically connected to the first tab portion or the first tab portion, and the container have a swaged joint portion having a concavo-convex structure projecting toward the other side from one side.

16 Claims, 10 Drawing Sheets

ENERGY STORAGE DEVICE

CROSS-REFERENCE TO RELATED APPLICATIONS

This application is based on Japanese Patent Applications No. 2016-175661 filed on Sep. 8, 2016, and No. 2017-159108 filed on Aug. 22, 2017, the entire contents of which are hereby incorporated by reference.

FIELD

The present invention relates to an energy storage device.

BACKGROUND

In an energy storage device, an electrode assembly is housed in a container, and terminals which are electrically connected to the electrode assembly are mounted on the container in a penetrating manner. Sealing members are interposed between the container and the terminals, and gas tightness around the terminals is ensured by the sealing members (see JP 2011-165643 A, for example).

Although gas tightness is ensured by the sealing member, when the sealing member is broken by a chance, there is a possibility that a leakage of a gas occurs from a portion of the container where the terminal penetrates.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage device where a possibility of the occurrence of leakage of a gas can be reduced.

According to an aspect of the present invention, there is provided an energy storage device which includes: an electrode assembly having a body portion and a first tab portion projecting from the body portion; and a container housing the electrode assembly, wherein a first current collector electrically connected to the first tab portion or the first tab portion, and the container have a swaged joint portion having a concavo-convex structure projecting toward the other side from one side.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
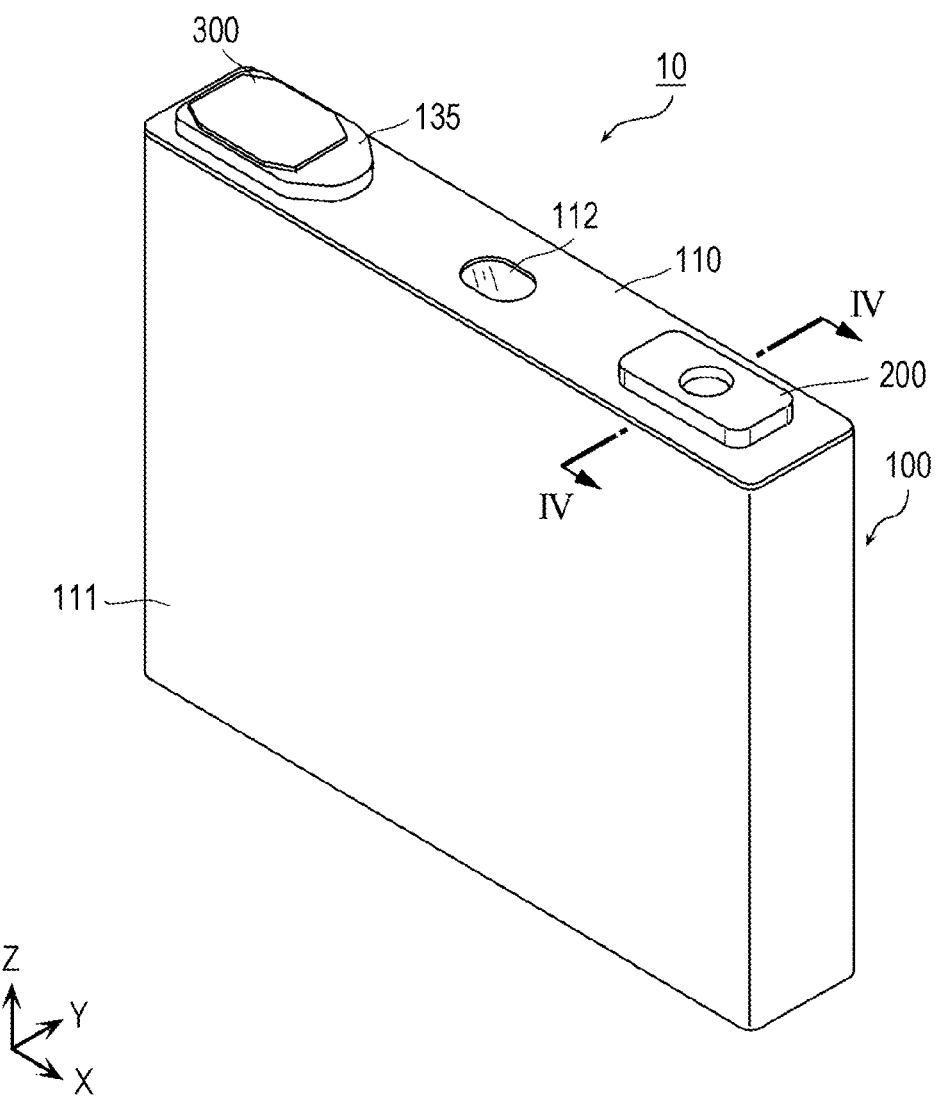
FIG. 1 is a perspective view showing an external appearance of an energy storage device according to an embodiment.

According to an aspect of the present invention, there is provided an energy storage device which includes: an electrode assembly having a body portion and a first tab portion projecting from the body portion; and a container housing the electrode assembly, wherein a first current collector electrically connected to the first tab portion or the first tab portion, and the container have a swaged joint portion having a concavo-convex structure projecting toward the other side from one side.

With such a configuration, the first current collector electrically connected to the first tab portion or the first tab portion, and the container have the swaged joint portion having the concavo-convex structure projecting toward the other side from one side. Thus, the first current collector or the first tab portion is connected to the container even when the first current collector or the first tab portion is not made to penetrate the container. Accordingly, gas tightness can be ensured between the first current collector or the first tab portion and the container even when the sealing member is not provided. As a result, even compared to the case where gas tightness is ensured using the sealing member, it is possible to reduce a possibility of the occurrence of leakage of a gas.

The electrode assembly may have a second tab portion projecting from the body portion, and the energy storage device may include: the first current collector; a second current collector electrically connected to the second tab portion; a conductive member mounted on the container and electrically connected to the first tab portion through the first current collector; a second terminal mounted on the container, penetrating the container and electrically connected to the second tab portion through the second current collector; and an insulating sealing member disposed between the second terminal or the second current collector and the container.

Because the insulating sealing member is disposed between the second terminal or the second current collector and the container, it is possible to prevent short-circuiting between a conductive member side and a polarity on an electrode terminal side on the container.

The first tab portion, the conductive member and the first current collector may have positive polarity, and the second tab portion, the second terminal and the second current collector may have negative polarity.

With such a configuration, the first tab portion or the first current collector having positive polarity is electrically connected to the container and hence, the container has a positive potential. Accordingly, the container is minimally melted and can maintain a stable state for a long period.

The swaged joint portion of the container may form a first terminal, and the conductive member may be formed of a bus bar connected to the first terminal.

With such a configuration, the swaged joint portion of the container forms the first terminal connected to the bus bar and hence, it is unnecessary to additionally provide a member exclusively used as the first terminal. Accordingly, the number of parts can be reduced.

The conductive member may be positioned with respect to the swaged joint portion of the container.

With such a configuration, the conductive member is positioned with respect to the swaged joint portion of the container. Thus, the conductive member can be positioned even when a member exclusively used for positioning the conductive member is not additionally provided.

According to the present invention, a possibility of the occurrence of leakage of a gas in the energy storage device can be reduced.

Hereinafter, an energy storage device according to an embodiment of the present invention is described with reference to drawings. The respective drawings are schematic views, and the energy storage device is not always described with strict accuracy.

The embodiment described hereinafter describes one specific example of the present invention. In the embodiment described hereinafter, shapes, materials, constitutional elements, the arrangement positions and connection modes of the constitutional elements and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements.

First, the overall configuration of an energy storage device 10 according to the embodiment is described with reference to FIG. 1 and FIG. 2.

FIG. 1 is a perspective view showing an external appearance of the energy storage device 10 according to the embodiment. FIG. 2 is a partially exploded perspective view of the energy storage device 10 according to the embodiment.

In FIG. 1 and subsequent drawings, for the sake of convenience of the description, the description is made assuming a Z axis direction as a vertical direction. However, in an actual use mode of the energy storage device 10, there may be a case where the Z axis direction does not agree with the vertical direction.

The energy storage device 10 is a secondary battery capable of being charged with and discharging electricity. More specifically, the energy storage device 10 is a nonaqueous electrolyte secondary battery such as a lithium ion secondary battery. The energy storage device 10 is applicable to an electric vehicle (EV), a hybrid electric vehicle (HEV), a plug-in hybrid electric vehicle (PHEV) or the like. The energy storage device 10 is not limited to a nonaqueous electrolyte secondary battery, and may be a secondary battery other than a nonaqueous electrolyte secondary battery, or may be a primary battery or a capacitor.

Figure 2:
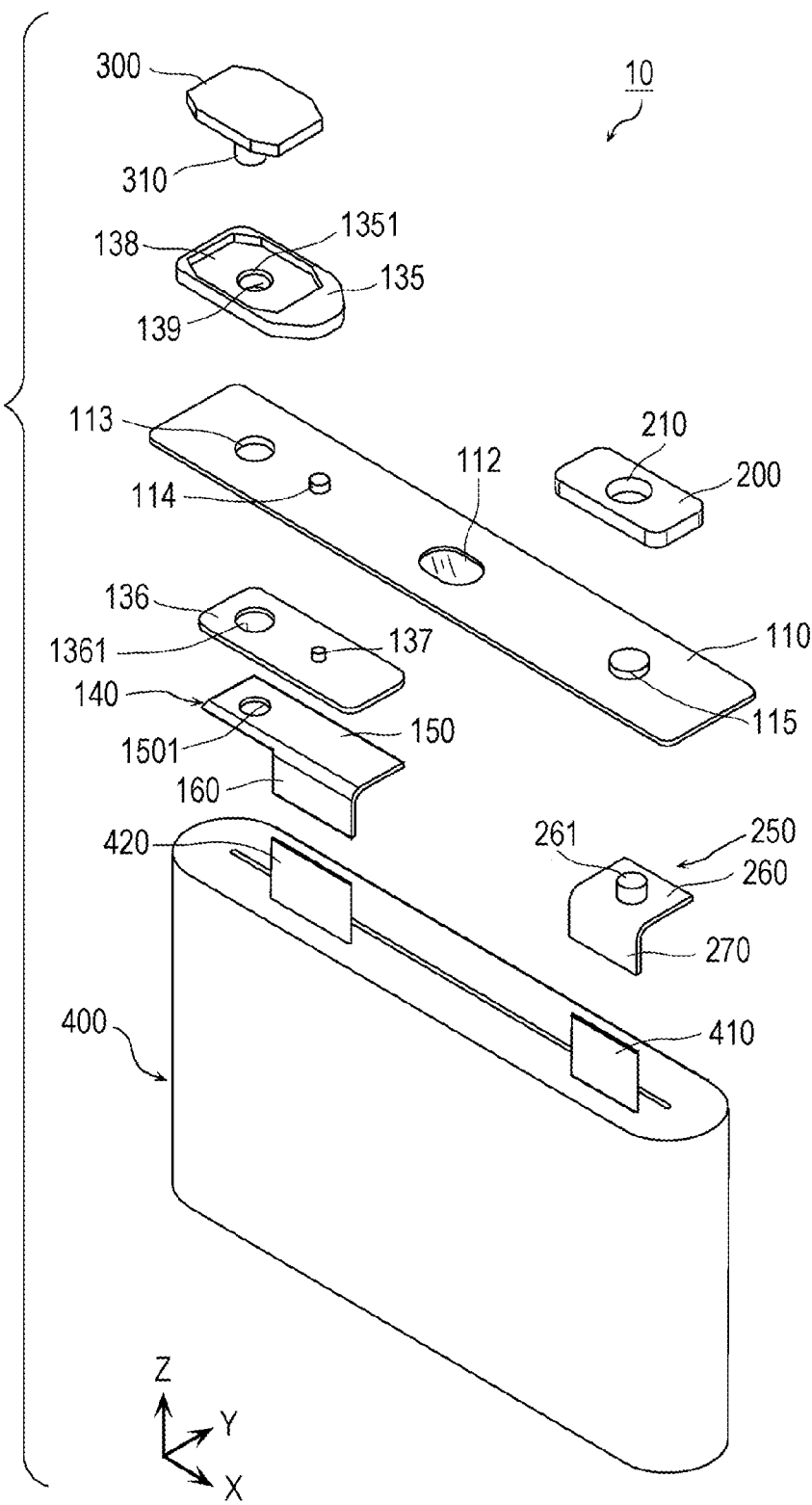
FIG. 2 is a partially exploded perspective view of the energy storage device according to the embodiment.

As shown in FIG. 1 and FIG. 2, the energy storage device 10 includes: a container 100; a positive electrode terminal 200; a positive electrode current collector 250; a negative electrode terminal 300; a negative electrode first sealing member 135; a negative electrode second sealing member 136; a negative electrode current collector 140; and an electrode assembly 400.

The container 100 includes a body 111 and a lid body 110. A material for forming the body 111 and the lid body 110 is not particularly limited provided that the material has conductivity. However, the material is weldable metal such as stainless steel, aluminum or an aluminum alloy, for example.

The body 111 is a cylindrical body having a rectangular shape as viewed in a top plan view. The body 111 has an opening on one end portion thereof, and a bottom on the other end portion thereof. In assembling the body 111, the electrode assembly 400 and the like are inserted into the body 111 of the container 100 through the opening.

An insulation sheet which covers the electrode assembly 400 may be disposed inside the body 111. The insulation sheet is made of a material having insulating property such as polycarbonate (PC), polypropylene (PP), polyethylene (PE) or a polyphenylene sulfide resin (PPS), for example. The insulation sheet is made to overlap with an inner peripheral surface of the body 111, and is positioned between the electrode assembly 400 and the body 111.

The body 111 is configured such that the electrode assembly 400, the insulation sheet and the like are housed in the inside of the body 111. Thereafter, the lid body 110 is joined to the body 111 by welding or the like so that the inside of the body 111 is hermetically sealed.

The lid body 110 is formed of a plate member which closes the opening of the body 111. As shown in FIG. 2, a gas release valve 112, a through hole 113, a negative electrode bulging portion 114 and a positive electrode bulging portion 115 are formed on the lid body 110.

The gas release valve 112 is opened when an internal pressure of the container 100 is increased so that the gas release valve 112 plays a role of releasing a gas in the container 100. The through hole 113 is a through hole having a circular shape as viewed in a plan view through which the negative electrode terminal 300 and the negative electrode first sealing member 135 are made to pass.

The negative electrode bulging portion 114 is formed on the lid body 110 such that a portion of the lid body 110 is formed into a bulging shape having a circular shape as viewed in a plan view. The negative electrode bulging portion 114 is used for positioning the negative electrode first sealing member 135. A recessed portion (not shown) which is a portion having a recessed shape is formed on a back side of the negative electrode bulging portion 114, and an engaging projection 137 of a negative electrode second sealing member 136 is engaged with a portion of the recessed portion. With such a configuration, the negative electrode second sealing member 136 is also positioned, and is fixed to the lid body 110.

The positive electrode bulging portion 115 is formed such that a portion of the lid body 110 is formed into a bulging shape having a circular shape as viewed in a plan view. The positive electrode bulging portion 115 is used for positioning the positive electrode terminal 200. A positive electrode current collector 250 is joined to the positive electrode bulging portion 115.

Although not shown, an electrolyte solution filling port through which an electrolyte solution is filled in the container 100 at the time of manufacturing the energy storage device 10 is formed in the lid body 110. The electrolyte solution filling port is sealed after the electrolyte solution is filled in the container 100.

A kind of electrolyte solution sealed in the container 100 is not particularly limited provided that the performance of the energy storage device 10 is not impaired, and various electrolyte solutions can be selectively used.

The positive electrode terminal 200 is an electrode terminal (first terminal) electrically connected to a positive electrode of the electrode assembly 400 through the lid body 110 and the positive electrode current collector 250. The positive electrode terminal 200 is a metal-made electrode terminal through which electricity stored in the electrode assembly 400 is taken out to a space outside the energy storage device 10, and through which electricity is introduced into a space inside the energy storage device 10 for storing the electricity in the electrode assembly 400. Although not shown, a bus bar which is a conductive member is connected to the positive electrode terminal 200 so that the positive electrode terminal 200 is connected to another energy storage device or an electronic apparatus outside the energy storage device 10 through the bus bar. The positive electrode terminal 200 is made of metal such as aluminum or an aluminum alloy.

An outer shape of the positive electrode terminal 200 is an approximately rectangular shape as viewed in a plan view, and a through hole 210 is formed in a center portion of the positive electrode terminal 200. The positive electrode bulging portion 115 of the lid body 110 is inserted into the through hole 210 of the positive electrode terminal 200. A peripheral edge of the positive electrode terminal 200 is welded to an upper surface of the lid body 110 by laser welding or the like, for example, so that the positive electrode terminal 200 and the lid body 110 are joined to each other. The positive electrode terminal 200 is a conductive member connected to the lid body 110 of the container 100.

The positive electrode current collector 250 is a member (first current collector) disposed between the electrode assembly 400 and the lid body 110 so as to electrically connect the electrode assembly 400 and the positive electrode terminal 200 to each other through the lid body 110. The positive electrode current collector 250 is made of metal such as aluminum or an aluminum alloy. More specifically, the positive electrode current collector 250 is a current collector electrically connected to a positive electrode tab portion 410 of the electrode assembly 400 (first tab portion) and, at the same time, is electrically connected to the positive electrode terminal 200 through the lid body 110. The positive electrode current collector 250 is described in detail later.

The negative electrode terminal 300 is an electrode terminal (second terminal) electrically connected to a negative electrode of the electrode assembly 400 through the negative electrode current collector 140. The negative electrode terminal 300 is a metal-made electrode terminal through which electricity stored in the electrode assembly 400 is taken out to a space outside the energy storage device 10, and through which electricity is introduced into a space inside the energy storage device 10 for storing the electricity in the electrode assembly 400. A bus bar which is a conductive member is connected to the negative electrode terminal 300 so that the negative electrode terminal 300 is connected to another energy storage device or an electronic apparatus outside the energy storage device 10 through the bus bar. The negative electrode terminal 300 is made of metal such as aluminum or an aluminum alloy.

A fastening portion 310 for fastening the container 100 and the negative electrode current collector 140 with each other is formed on the negative electrode terminal 300.

The fastening portion 310 is a columnar shaft member (rivet) extending downward from the negative electrode terminal 300. The fastening portion 310 is inserted into a through hole 1501 formed in the negative electrode current collector 140, and fastens the negative electrode terminal 300 and the negative electrode current collector 140 together by swaging. More specifically, the fastening portion 310 is inserted into a through hole 1351 formed in the negative electrode first sealing member 135, the through hole 113 formed in the lid body 110, a through hole 1361 formed in the negative electrode second sealing member 136, and a through hole 1501 formed in the negative electrode current collector 140, and fastens the negative electrode first sealing member 135, the lid body 110, the negative electrode second sealing member 136 and the negative electrode current collector 140 together by swaging. With such a configuration, the negative electrode terminal 300 and the negative electrode current collector 140 are electrically connected to each other. The negative electrode current collector 140 is fixed to the lid body 110 together with the negative electrode terminal 300, the negative electrode first sealing member 135, and the negative electrode second sealing member 136.

The fastening portion 310 may be formed as an integral body with the negative electrode terminal 300. Alternatively, the fastening portion 310 may be formed as a part separate from the negative electrode terminal 300, and the fastening portion 310 may be fixed to the negative electrode terminal 300 by a technique such as swaging or welding. The fastening portion 310 may be made of metal such as copper or a copper alloy which differs from metal for forming the negative electrode terminal 300.

The negative electrode first sealing member 135 is a gasket disposed between the lid body 110 and the negative electrode terminal 300. The negative electrode first sealing member 135 has insulating property, and provides electrical insulation between the negative electrode terminal 300 and the lid body 110. The negative electrode first sealing member 135 is made of a material having insulating property such as PC, PP, PE or PPS, for example.

A housing recessed portion 138 for housing the negative electrode terminal 300 is formed on an upper surface of the negative electrode first sealing member 135. A cylindrical portion 139 which is inserted into the through hole 113 formed in the lid body 110 projects from a lower surface of the negative electrode first sealing member 135. A through hole 1351 having a circular shape as viewed in a plan view which penetrates the cylindrical portion 139 is formed on a bottom surface of the housing recessed portion 138. An engaging recessed portion (not shown) which is engaged with the negative electrode bulging portion 114 from above is formed on a lower surface of the negative electrode first sealing member 135. The engaging recessed portion is engaged with the negative electrode bulging portion 114 so that the negative electrode first sealing member 135 is positioned.

The negative electrode second sealing member 136 is a gasket disposed between the lid body 110 and the negative electrode current collector 140. The negative electrode second sealing member 136 has insulating property, and provides electrical insulation between the lid body 110 and the negative electrode current collector 140. In the same manner as the negative electrode first sealing member 135, the negative electrode second sealing member 136 is made of a material having insulating property such as PC, PP, PE or PPS, for example.

The engaging projection 137 which is engaged with the recessed portion of the negative electrode bulging portion 114 from below projects from an upper surface of the negative electrode second sealing member 136. The engaging projection 137 is engaged with the recessed portion of the negative electrode bulging portion 114 so that the negative electrode second sealing member 136 is positioned. A through hole 1361 having a circular shape as viewed in a plan view is formed in one end portion of the negative electrode second sealing member 136. The fastening portion 310 of the negative electrode terminal 300 is inserted into the through hole 1361.

The negative electrode current collector 140 is a member (second current collector) disposed between the electrode assembly 400 and the lid body 110 so as to electrically connect the electrode assembly 400 and the negative electrode terminal 300 to each other. The negative electrode current collector 140 is formed of a metal plate body made of copper, a copper alloy or the like. More specifically, the negative electrode current collector 140 is a current collector which is electrically connected to a negative electrode tab portion 420 of the electrode assembly 400 (second tab portion) and, at the same time, is electrically connected to the fastening portion 310 of the negative electrode terminal 300.

The negative electrode current collector 140 is a member formed by bending a plate body. The negative electrode current collector 140 includes a first joint portion 150 joined to the fastening portion 310 of the negative electrode terminal 300 and a second joint portion 160 joined to the negative electrode tab portion 420 of the electrode assembly 400 as integral parts thereof.

The through hole 1501 having a circular shape as viewed in a plan view is formed in the first joint portion 150. The fastening portion 310 of the negative electrode terminal 300 is inserted into the through hole 1501. In assembling the energy storage device 10, the through hole 1501 formed in the first joint portion 150, the through hole 1351 formed in the negative electrode first sealing member 135, the through hole 113 formed in the lid body 110 and the through hole 1361 formed in the negative electrode second sealing member 136 are made to communicate with each other, and the fastening portion 310 of the negative electrode terminal 300 is inserted into these holes and fastens these members together by caulking. With such a configuration, the negative electrode terminal 300 and the negative electrode current collector 140 are electrically connected to each other, and the negative electrode current collector 140, the negative electrode terminal 300, the negative electrode first sealing member 135 and the negative electrode second sealing member 136 are fixed to the lid body 110.

The second joint portion 160 is connected to the negative electrode tab portion 420 of the electrode assembly 400 by welding such as ultrasonic welding, resistance welding or laser welding, for example.

Next, the configuration of the electrode assembly 400 is described with reference to FIG. 3.

Figure 3:
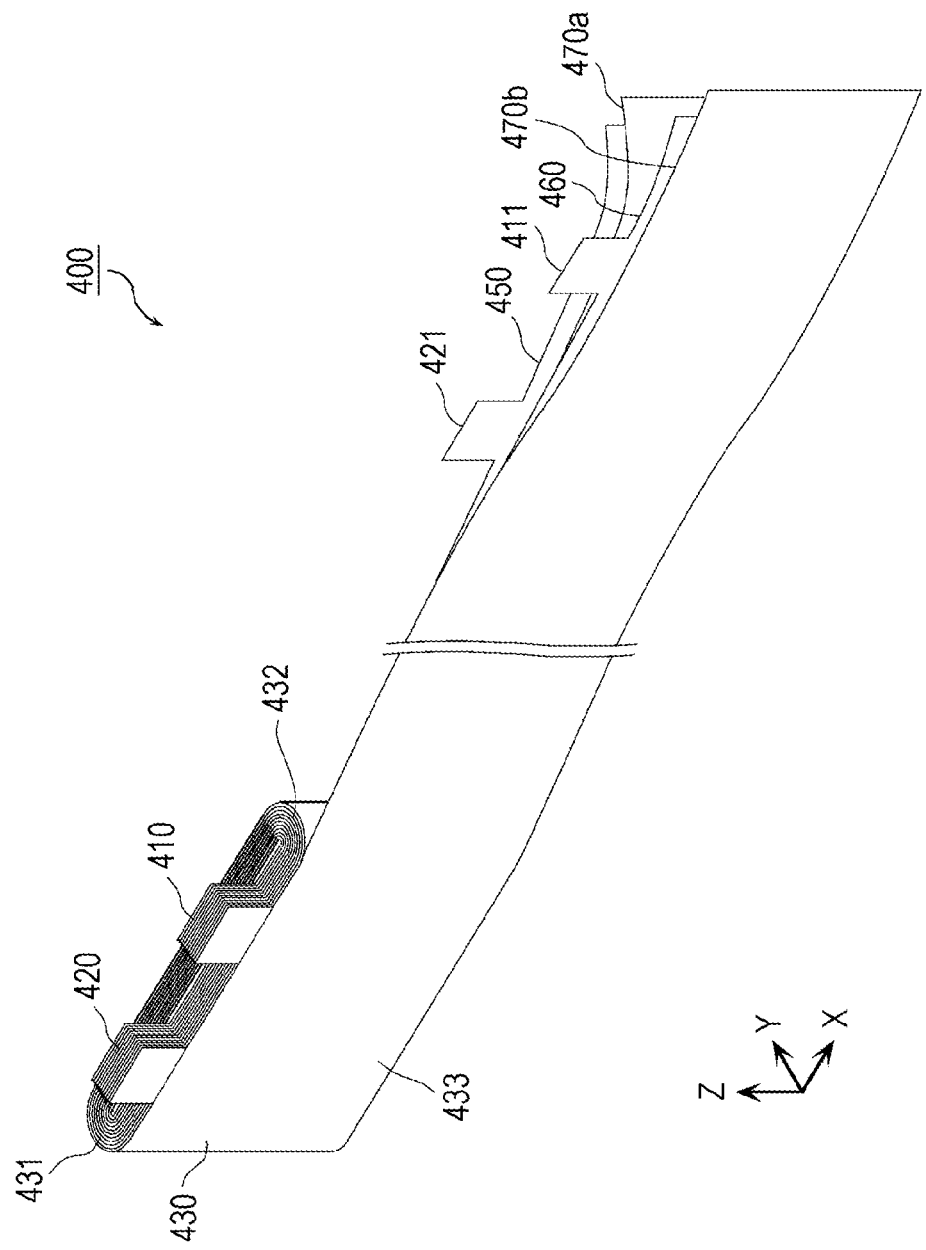
FIG. 3 is a perspective view showing a configuration of an electrode assembly according to the embodiment.

FIG. 3 is a perspective view showing the configuration of the electrode assembly 400 according to the embodiment. FIG. 3 shows the electrode assembly 400 in a wound state in a partially developed manner.

The electrode assembly 400 is an energy storage element (power generating element) which can store electricity. The electrode assembly 400 is formed such that a positive electrode 460, a negative electrode 450 and separators 470a and 470b are alternately stacked with each other and wound around each other. That is, the electrode assembly 400 is formed such that the negative electrode 450, the separator 470a, the positive electrode 460 and the separator 470b are stacked with each other in this order, and, are wound around each other so as to form an elongated circular shape in cross section.

The positive electrode 460 is a plate where a positive active material layer is formed on a surface of a positive electrode substrate layer formed using a metal foil having an elongated strip shape and made of aluminum, an aluminum alloy or the like. As a positive active material used for forming the positive active material layer, any known material can be used as desired provided that the positive active material can occlude and discharge lithium ions. For example, as a positive active material, a polyanion compound such as $LiMPO_4$, $Li_2MSiO_4$, $LiMBO_3$ (M being one kind or two or more kinds of transition metal elements selected from a group consisting of Fe, Ni, Mn, Co and the like), a spinel compound such as lithium manganese oxide, a lithium transition metal oxide such as $LiMO_2$ (M being one kind or two or more kinds of transition metal elements selected from a group consisting of Fe, Ni, Mn, Co and the like) or the like can be used.

The negative electrode 450 is a plate where a negative active material layer is formed on a surface of a negative electrode substrate layer formed using a metal foil having an elongated strip shape and made of copper, a copper alloy or the like. As a negative active material used for forming the negative active material layer, any known material can be used as desired provided that the negative active material can occlude and discharge lithium ions. For example, as a negative active material, in addition to lithium metal and a lithium alloy (an alloy containing lithium metal such as lithium-aluminum, lithium-lead, lithium-tin, lithium-aluminum-tin, lithium-gallium or Wood's alloy), an alloy which can occlude and discharge lithium, a carbon material (for example, graphite, hardly graphitizable carbon, easily graphitizable carbon, low temperature baked carbon, amorphous carbon or the like), a metal oxide, a lithium metal oxide ($Li_4Ti_5O_{12}$ or the like), a polyphosphoric acid compound or the like can be named.

The separators 470a, 470b are each a microporous sheet made of a resin. As a material for forming the separators 470a, 470b used in the energy storage device 10, any known material can be used as desired provided that performances of the energy storage device 10 are not impaired.

The positive electrode 460 has a plurality of projecting portions 411 projecting outward on one edge thereof in the direction of the winding axis. In the same manner, the negative electrode 450 also has a plurality of projecting portions 421 projecting outward on one edge thereof in the direction of the winding axis. The plurality of projecting portions 411 and the plurality of projecting portions 421 are portions where an active material is not applied by coating so that the substrate layer is exposed (active material non-coated portions).

The winding axis is an imaginary axis which is used as a center axis at the time of winding the positive electrode 460, the negative electrode 450 and the like. In this embodiment, the winding axis is a straight line which passes the center of the electrode assembly 400 and extends parallel to the Z axis direction.

The plurality of projecting portions 411 and the plurality of projecting portions 421 are disposed on an edge of the positive electrode 460 and an edge of the negative electrode 450, respectively, on the same side in the direction of the winding axis (edges on a plus side in the Z axis direction in FIG. 3). When the positive electrode 460 and the negative electrode 450 are stacked with each other, the plurality of projecting portions 411 and the plurality of projecting portions 421 are respectively stacked with each other at predetermined positions in the electrode assembly 400. More specifically, when the positive electrode 460 is stacked by winding, the plurality of projecting portions 411 are stacked on one edge of the positive electrode 460 in the direction of the winding axis at a predetermined position in the circumferential direction. Further, when the negative electrode 450 is stacked by winding, the plurality of projecting portions 421 are stacked on one edge of the negative electrode 450 in the direction of the winding axis at a predetermined position in the circumferential direction which differs from the position where the plurality of projecting portions 411 are stacked.

As a result, the negative electrode tab portion 420 formed by stacking the plurality of projecting portions 421 and the positive electrode tab portion 410 formed by stacking the plurality of projecting portions 411 are formed on the electrode assembly 400. The positive electrode tab portion 410 is gathered toward the center in the stacking direction, for example, and is joined to the positive electrode current collector 250. The negative electrode tab portion 420 is gathered toward the center in the stacking direction, for example, and is joined to the negative electrode current collector 140.

The tab portions 410, 420 are portion through which electricity is introduced into and discharged from the electrode assembly 400, and may be referred to as "leads (lead portions)", "current collecting portions" or the like.

In this embodiment, the positive electrode tab portion 410 is formed by stacking the projecting portions 411 where the substrate layer is exposed and hence, the positive electrode tab portion 410 does not contribute to the storing of electricity. In the same manner, the negative electrode tab portion 420 is formed by stacking the projecting portions 421 where the substrate layer is exposed and hence, the negative electrode tab portion 420 does not contribute to the storing of electricity. On the other hand, a portion of the electrode assembly 400 other than the positive electrode tab portion 410 and the negative electrode tab portion 420 is formed by stacking portions where an active material is applied to the substrate layer by coating and hence, such a portion contributes to the storing of electricity. Hereinafter, such a portion is referred to as "body portion 430". Both end portions of the body portion 430 in the X axis direction form curved portions 431, 432 each of which has a curved outer peripheral surface. Portions of the electrode assembly 400 disposed between the curved portions 431 and 432 form flat portions 433 each of which has a flat outer side surface. As described above, the electrode assembly 400 is formed into an elongated circular shape where the flat portions 433 are disposed between two curved portions 431 and 432.

Next, the joint structure between the positive electrode current collector 250 and the lid body 110 is described along with description of the specific configuration of the positive electrode current collector 250.

Figure 4:
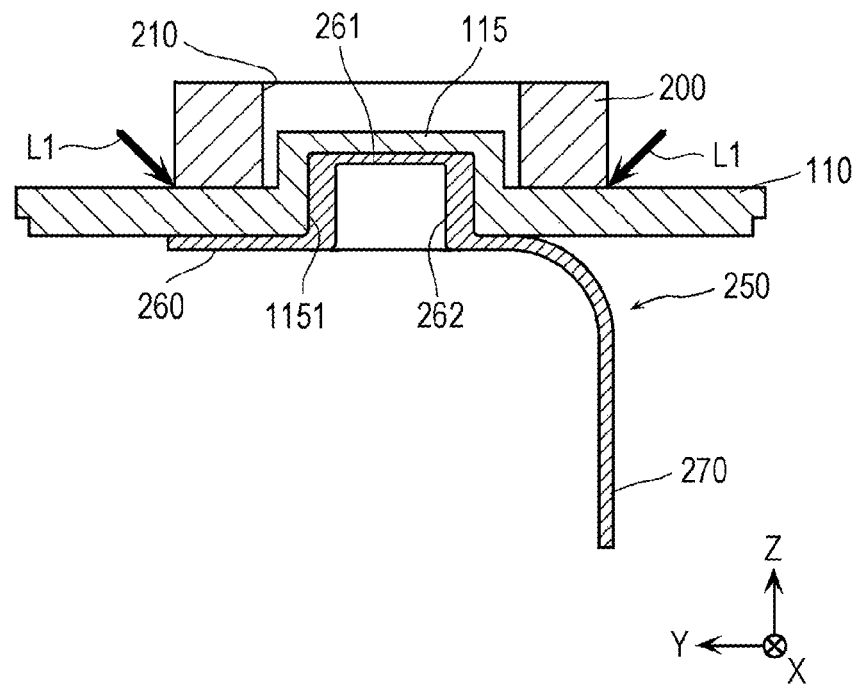
FIG. 4 is a cross-sectional view showing a joint structure between a lid body and a positive electrode current collector according to the embodiment.

FIG. 4 is a cross-sectional view showing the joint structure between the lid body 110 and the positive electrode current collector 250 according to this embodiment. More specifically, FIG. 4 is a cross-sectional view showing a Z-Y cross section including line IV-IV in FIG. 1.

As shown in FIG. 2 and FIG. 4, on the back side of the positive electrode bulging portion 115 of the lid body 110, a recessed portion 1151 which is a portion having a recessed shape is formed. The positive electrode bulging portion 115 and the recessed portion 1151 have a relationship similar to a relationship between a front side and a back side of a coin where the positive electrode bulging portion 115 and the recessed portion 1151 do not communicate with each other.

The positive electrode current collector 250 is a member formed by bending a plate body. The positive electrode current collector 250 includes: a first joint portion 260 joined to the lid body 110; and a second joint portion 270 joined to the positive electrode tab portion 410 of the electrode assembly 400 as integral parts thereof.

A protruding portion 261 having a circular shape as viewed in a plan view which is fitted in the recessed portion 1151 of the lid body 110 is formed on the first joint portion 260. A recessed portion 262 which is a portion having a recessed shape is formed on the back side of the protruding portion 261. The protruding portion 261 and the recessed portion 262 have a relationship similar to a relationship between a front side and a back side of a coin where the protruding portion 261 and the recessed portion 262 do not communicate with each other. The protruding portion 261 and the recessed portion 262 are a swaged joint portion formed by making the first joint portion 260 joined to the lid body 110 by clinching. The protruding portion 261 and the recessed portion 262 are not formed on the first joint portion 260 before the first joint portion 260 is joined to the lid body 110 by clinching. In the same manner, the positive electrode bulging portion 115 and the recessed portion 1151 of the lid body 110 are also a swaged joint portion formed by making a portion of the positive electrode current collector 250 joined to the lid body 110 by clinching. The positive electrode bulging portion 115 and the recessed portion 1151 are not formed on the lid body 110 before the portion of the positive electrode current collector 250 is joined to the lid body 110 by clinching. After such clinching, the swaged joint portion (the protruding portion 261, the recessed portion 262, the positive electrode bulging portion 115 and the recessed portion 1151) having the concavo-convex structure where the concavo-convex structure projects from the positive electrode current collector 250 to the lid body 110 is formed.

In this embodiment, "clinching" is a joining method where plate members are made to overlap with each other with a die (corresponding to a receiving jig having no protrusion) placed as a backing supporting the plate members, and a punch (corresponding to a pressing jig having a protrusion) is locally pressed into the plate members thus plastically deforming the plate members such that one plate member is fitted in the other plate member thus forming an interlock. By joining the protruding portion 261 of the first joint portion 260 and the recessed portion 1151 of the lid body 110 by clinching, the protruding portion 261 and the recessed portion 1151 are formed into a firmly fastened state.

The swaged joint portion formed by clinching is described in more detail.

Figure 5:
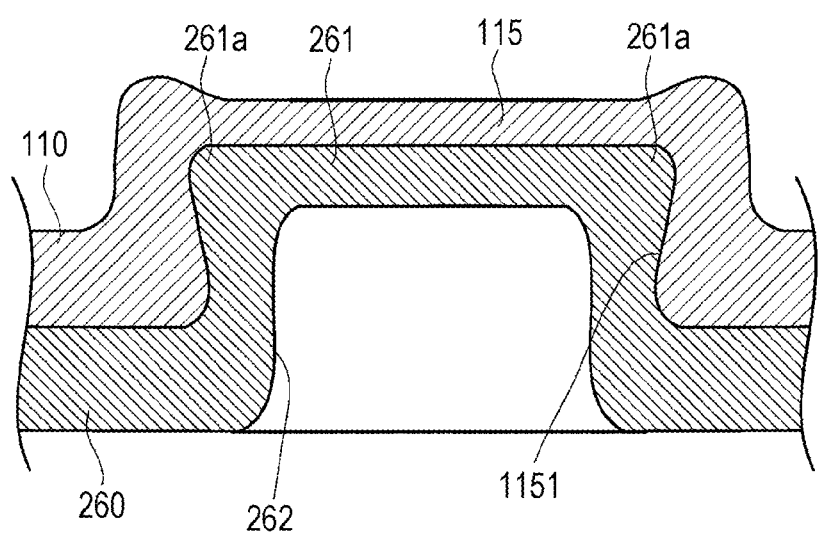
FIG. 5 is a cross-sectional view showing a swaged joint portion according to the embodiment in an enlarged manner.

FIG. 5 is a cross-sectional view showing the swaged joint portion according to the embodiment in an enlarged manner. As shown in FIG. 5, in the swaged joint portion, the protruding portion 261 is a convex portion which projects in the direction (Z axis direction) orthogonal to a joint plane between the first joint portion 260 and the lid body 110 (a plane parallel to an XY plane), and has a circular cylindrical shape with a closed distal end. The protruding portion 261 is not limited to the one having a circular cylindrical shape and may be one having any shape with a closed distal end.

The protruding portion 261 also has an expanding portion 261a which projects in the direction (outward direction) intersecting with the projecting direction (Z axis direction) of the protruding portion 261. In this embodiment, the expanding portion 261a projects in the direction orthogonal to the projecting direction over the whole circumference. However, the expanding portion 261a may be formed such that a part of the whole circumference of the expanding portion 261a does not project. The first expanding portion 261a has a shape where the first expanding portion 261a is engaged with the recessed portion 1151. Between the first expanding portion 261a and the recessed portion 1151, a slight gap may be partially formed.

In performing clinching, it is preferable that a thickness of a portion of the lid body 110 to which clinching is scheduled to be applied be set smaller than a thickness of other portions of the lid body 110 in advance. More specifically, a thickness of the portion of the lid body 110 to which clinching is scheduled to be applied is reduced in advance by applying a countersinking process to the portion, for example. Due to such a reduction of thickness, after clinching is performed, the recessed portion 1151 of the lid body 110 and the protruding portion 261 of the positive electrode current collector 250 can be more firmly fastened to each other.

The second joint portion 270 is connected to the positive electrode tab portion 410 of the electrode assembly 400 by welding such as ultrasonic welding, resistance welding or laser welding, for example.

In this embodiment, at least a portion of a peripheral edge of the positive electrode terminal 200 is welded to an upper surface of the lid body 110 by laser welding. More specifically, as shown in FIG. 4, a laser beam L1 inclined with respect to the upper surface of the lid body 110 is irradiated to an area in the vicinity of a boundary between the peripheral edge of the positive electrode terminal 200 and the lid body 110 so that the positive electrode terminal 200 and the lid body 110 are joined to each other by welding. Accordingly, the positive electrode terminal 200 is electrically connected to the positive electrode current collector 250 through the lid body 110.

As described above, according to this embodiment, the positive electrode current collector 250 electrically connected to the positive electrode tab portion 410 and the lid body 110 of the container 100 have the swaged joint portion (the protruding portion 261, the recessed portion 262, the positive electrode bulging portion 115 and the recessed portion 1151) having the concavo-convex structure projecting toward the other side from one side and hence, the positive electrode current collector 250 can be connected to the lid body 110 even when the positive electrode current collector 250 is not made to penetrate the lid body 110. Accordingly, gas tightness can be ensured between the positive electrode current collector 250 and the lid body 110 even when the sealing member is not provided. As a result, even compared to the case where gas tightness is ensured using the sealing member, it is possible to reduce a possibility of the occurrence of leakage of a gas. For example, even compared to the case where a sealing member is provided to both the positive electrode and the negative electrode respectively, a possibility of the occurrence of leakage of a gas can be halved.

The negative electrode second sealing member 136 having insulating property is disposed between the negative electrode current collector 140 and the lid body 110 and hence, it is possible to prevent short-circuiting between the positive electrode and the negative electrode on the lid body 110.

The lid body 110 is also electrically connected to the positive electrode terminal 200 and the positive electrode current collector 250 and hence, the container 100 has a positive potential. Accordingly, an electrical connection can be established by a portion of the container 100 other than the positive electrode terminal 200. When the container 100 has a positive potential, the container 100 is minimally melted and can maintain a stable state for a long period.

The positive electrode terminal 200 is positioned with respect to the swaged joint portion (positive electrode bulging portion 115) of the lid body 110. Thus, the positive electrode terminal 200 can be positioned even when a member exclusively used for positioning the positive electrode terminal 200 is not additionally provided.

(Other Embodiments)

The energy storage device according to the present invention has been described with reference to the embodiment heretofore. However, the present invention is not limited to the above-mentioned embodiment. Configurations acquired by applying various modifications conceived by those who are skilled in the art to the embodiment, or configurations acquired by combining the plurality of constitutional elements described heretofore are also included in the scope of the present invention unless these configurations depart from the gist of the present invention.

In the description made hereinafter, there may be cases where parts identical with the parts in the above-mentioned embodiment are given the same symbols, and the description of such parts is omitted.

(Modification 1)

In the above-mentioned embodiment, the description has been made by exemplifying the case where the positive electrode terminal 200 has a columnar shape extending in the vertical direction. However, in the modification 1, the description is made by exemplifying a case where a positive electrode terminal has a flange portion on a lower end portion of the positive electrode terminal.

Figure 6:
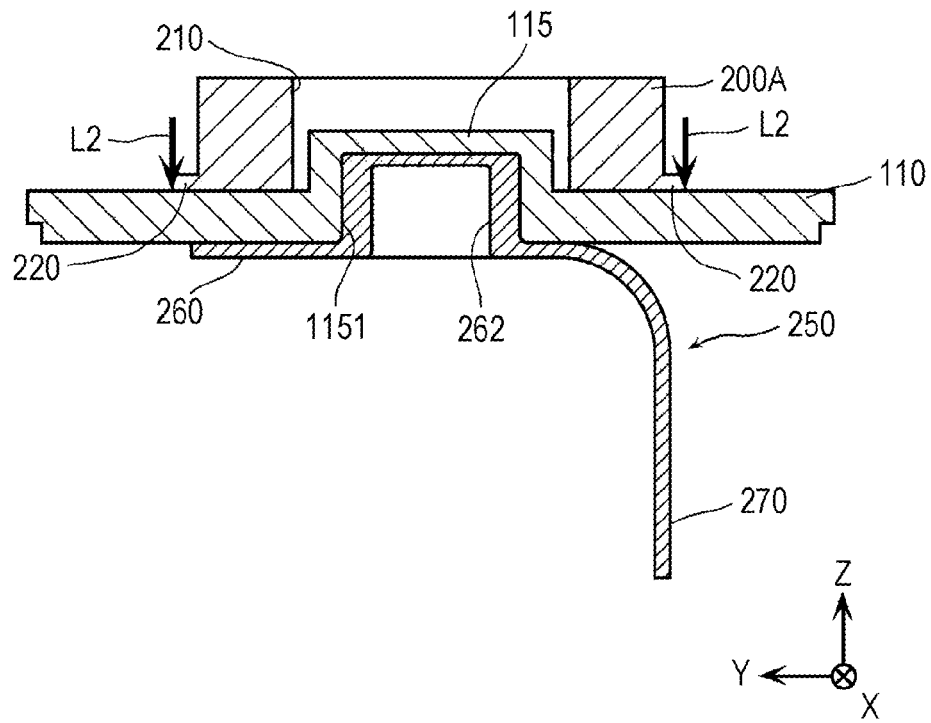
FIG. 6 is a cross-sectional view showing a schematic configuration of a positive electrode terminal according to a modification 1.

FIG. 6 is a cross-sectional view showing a schematic configuration of a positive electrode terminal 200A according to the modification 1. More specifically, FIG. 6 corresponds to FIG. 4.

As shown in FIG. 6, a flange portion 220 projecting outward from an outer peripheral surface of the positive electrode terminal 200A is formed on a lower end portion of the positive electrode terminal 200A over the whole circumference. When the positive electrode terminal 200A has the flange portion 220 as described above, a laser beam L2 orthogonal to the upper surface of the lid body 110 can be irradiated to an area in the vicinity of a boundary between an outer peripheral edge of the flange portion 220 and the lid body 110. Accordingly, even compared to the case where the laser beam L2 is obliquely irradiated, a welding efficiency by the laser beam L2 can be increased.

(Modification 2)

In the above-mentioned embodiment, the description has been made by exemplifying the case where only the outer peripheral edge of the positive electrode terminal 200 is welded to the lid body 110. However, in the modification 2, the description is made by exemplifying a case where an inner peripheral edge of a positive electrode terminal is also welded.

Figure 7:
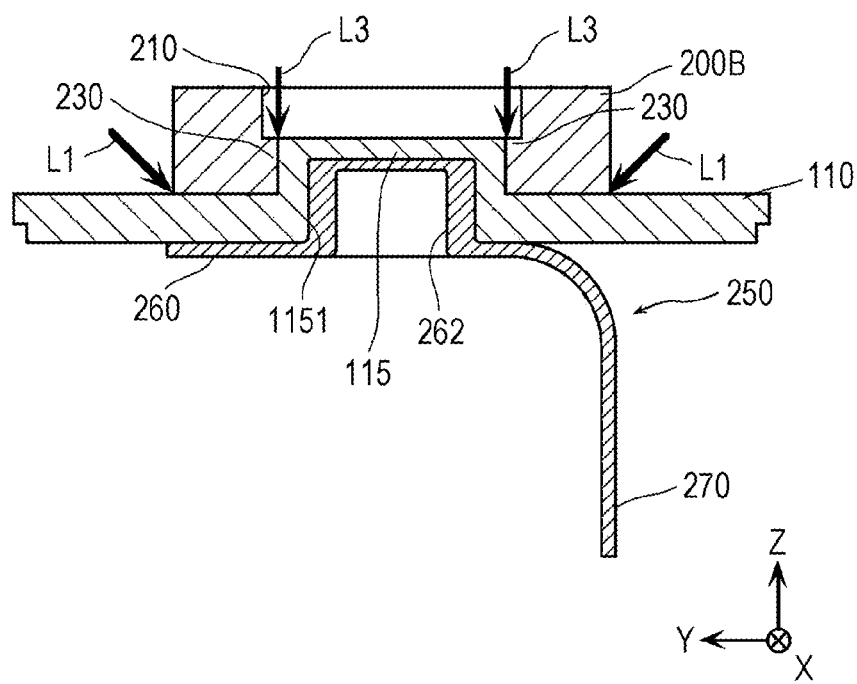
FIG. 7 is a cross-sectional view showing a schematic configuration of a positive electrode terminal according to a modification 2.

FIG. 7 is a cross-sectional view showing the schematic configuration of a positive electrode terminal 200B according to the modification 2. More specifically, FIG. 7 corresponds to FIG. 4.

As shown in FIG. 7, a protruding portion 230 which projects inward from an inner peripheral surface of a through hole 210 of a positive electrode terminal 200B is formed on the positive electrode terminal 200B over the whole circumference. Due to the formation of the protruding portion 230, a positive electrode bulging portion 115 of a lid body 110 is disposed in the through hole 210 without forming a gap between the through hole 210 and the positive electrode bulging portion 115. Further, an upper surface of the protruding portion 230 and an upper surface of the positive electrode bulging portion 115 are made coplanar with each other.

As described above, with the formation of the protruding portion 230 on the positive electrode terminal 200B, a laser beam L3 orthogonal to the upper surface of the positive electrode bulging portion 115 can be irradiated to an area in the vicinity of a boundary between an inner peripheral edge of the protruding portion 230 and the positive electrode bulging portion 115. Accordingly, the inner peripheral edge of the positive electrode terminal 200B can be also welded to the lid body 110 together with an outer peripheral edge of the positive electrode terminal 200B and hence, the positive electrode terminal 200B and the lid body 110 can be more firmly joined to each other.

Only the inner peripheral edge of the positive electrode terminal 200B may be welded to the lid body 110.

(Modification 3)

In the above-mentioned embodiment, the description has been made by taking the positive electrode terminal 200 as one example of the conductive member connected to the container 100. However, in the modification 3, the description is made by exemplifying a case where a lid body per se forms a positive electrode terminal, and a bus bar connected to the lid body forms a conductive member.

Figure 8:
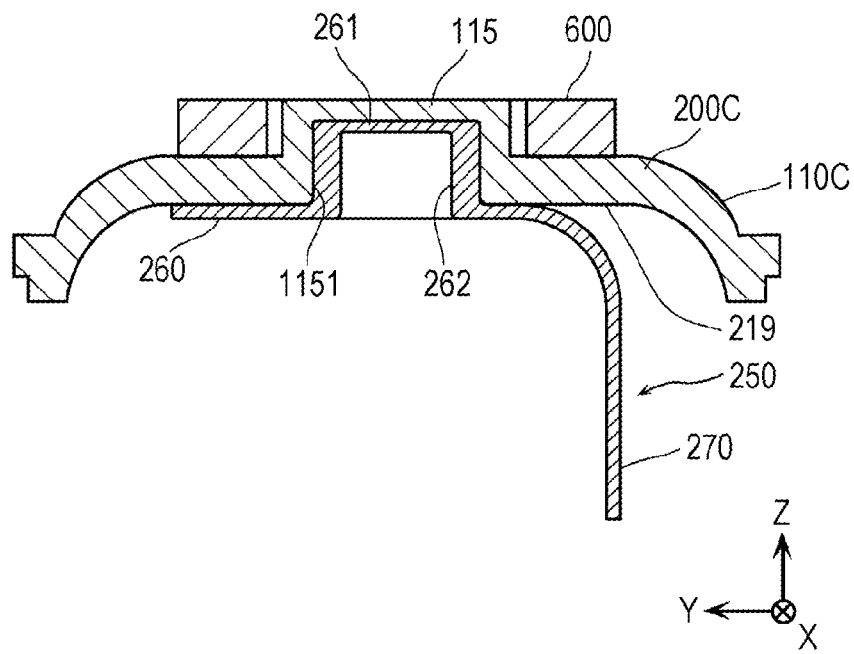
FIG. 8 is a cross-sectional view showing a joint structure between a lid body and a bus bar according to a modification 3.

FIG. 8 is a cross-sectional view showing the joint structure between a lid body 110C and a bus bar 600 according to the modification 3. More specifically, FIG. 8 corresponds to FIG. 4.

As shown in FIG. 8, a portion of the lid body 110C which includes a swaged joint portion (a positive electrode bulging portion 115) corresponds to a positive electrode terminal 200C. More specifically, the positive electrode terminal 200C of the lid body 110C is formed into a bulging shape having an elongated circular shape as viewed in a plan view (as viewed in the Z axis direction). A recessed portion 219 which is a portion having a recessed shape is formed on the back side of the positive electrode terminal 200C. The positive electrode terminal 200C and the recessed portion 219 have a relationship similar to a relationship between a front side and a back side of a coin. The positive electrode terminal 200C and the recessed portion 219 do not communicate with each other. The positive electrode bulging portion 115 is disposed at the center of the positive electrode terminal 200C. The bus bar 600 is joined to an upper surface of the positive electrode terminal 200C by welding in a state where the bus bar 600 is positioned by the positive electrode bulging portion 115.

As described above, the swaged joint portion (positive electrode bulging portion 115) of the lid body 110C forms the positive electrode terminal 200C, and the bus bar 600 connected to the positive electrode terminal 200C forms the conductive member and hence, it is unnecessary to additionally provide a member exclusively used as the positive electrode terminal. Accordingly, the number of parts can be reduced.

(Modification 4)

In the above-mentioned embodiment, the description has been made by exemplifying the case where the positive electrode current collector 250 and the lid body 110 are joined to each other by clinching. However, in the modification 4, the description is made by exemplifying a case where a lid body and a positive electrode tab portion of an electrode assembly are joined to each other by clinching without using a positive electrode current collector.

Figure 9:
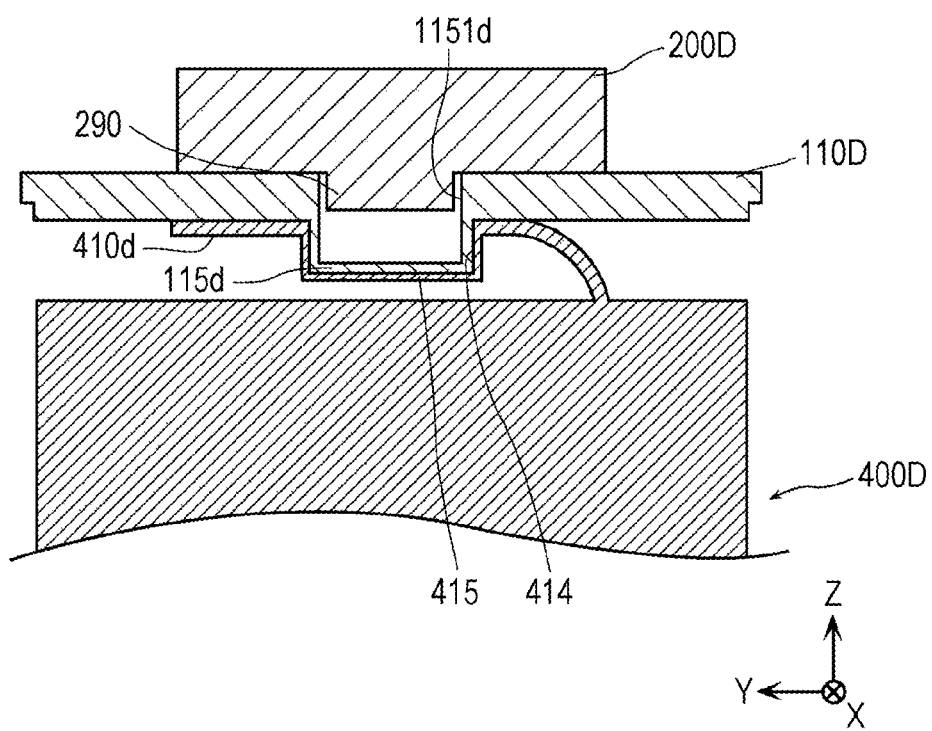
FIG. 9 is a cross-sectional view showing a joint structure between a lid body and a positive electrode tab portion of an electrode assembly according to a modification 4.

FIG. 9 is a cross-sectional view showing a joint structure between a lid body 110D and a positive electrode tab portion 410d of an electrode assembly 400D according to the modification 4. More specifically, FIG. 9 corresponds to FIG. 4.

As shown in FIG. 9, a positive electrode bulging portion 115d of the lid body 110D bulges toward the inside of the container 100 in a circular shape as viewed in a plan view. Further, a recessed portion 1151d which is a portion having a recessed shape is formed on the back side of the positive electrode bulging portion 115d. The positive electrode bulging portion 115d and the recessed portion 1151d have a relationship similar to a relationship between a front side and a back side of a coin. The positive electrode bulging portion 115d and the recessed portion 1151d do not communicate with each other. The positive electrode bulging portion 115d and the recessed portion 1151d of the lid body 110D form a swaged joint portion formed by making a portion of the positive electrode tab portion 410d joined to the lid body 110D by clinching. Accordingly, the positive electrode bulging portion 115d and the recessed portion 1151d are not formed on the lid body 110D before the portion of the positive electrode tab portion 410d is joined to the lid body 110D by clinching.

A through hole is not formed in the positive electrode terminal 200D, and a protrusion 290 inserted into the recessed portion 1151d of the lid body 110D is formed on a lower surface of the positive electrode terminal 200D. The protrusion 290 is inserted into the recessed portion 1151d of the lid body 110D so that the positive electrode terminal 200D is positioned.

A recessed portion 414 which has a circular shape as viewed in a plan view and into which the positive electrode bulging portion 115d of the lid body 110D is fitted is formed on the positive electrode tab portion 410d of the electrode assembly 400D. A protruding portion 415 is formed on the back side of the recessed portion 414. The recessed portion 414 and the protruding portion 415 have a relationship similar to a relationship between a front side and a back side of a coin. The recessed portion 414 and the protruding portion 415 do not communicate with each other. The recessed portion 414 and the protruding portion 415 form a swaged joint portion formed by making the positive electrode tab portion 410d joined to the lid body 110D by clinching. Accordingly, the recessed portion 414 and the protruding portion 415 are not formed on the positive electrode tab portion 410d before the positive electrode tab portion 410d is joined to the lid body 110D by clinching.

The recessed portion 414 of the positive electrode tab portion 410d and the positive electrode bulging portion 115d of the lid body 110D are formed in a firmly fastened state by clinching.

The positive electrode tab portion 410d is joined to the lid body 110D by clinching and hence, it is possible to suppress a possibility of the generation of metal powder from the electrode assembly 400D caused by welding.

In joining the lid body 110D to the positive electrode tab portion 410d by clinching, as shown in the modification 4, it is preferable to perform clinching such that the lid body 110D projects toward the inside of the container 100 from a viewpoint of manufacturing an energy storage device. However, the lid body 110D may project in a direction opposite to a direction toward the inside of the container 100.

In joining the positive electrode tab portion 410d and the lid body 110D to each other by clinching, it is preferable to perform clinching such that an intermediate member made of a conductive resin, for example, is interposed between the positive electrode tab portion 410d and the lid body 110D, and the positive electrode tab portion 410d and the lid body 110D are joined to each other together with the intermediate member by clinching. With such a configuration, it is possible to suppress a damage to the positive electrode tab portion 410d at the time of performing clinching.

(Modification 5)

In the modification 4, the case has been exemplified where only the positive electrode tab portion 410d of the electrode assembly 400D and the lid body 110D are joined to each other by clinching. However, in the modification 5, the description is made with respect to the case where a reinforcing member 700 is joined together with a positive electrode tab portion 410d and a lid body 110D by clinching. In the description made hereinafter, parts identical with the parts in the above-mentioned modification 4 are given the same symbols, and the description of such parts may be omitted.

Figure 10:
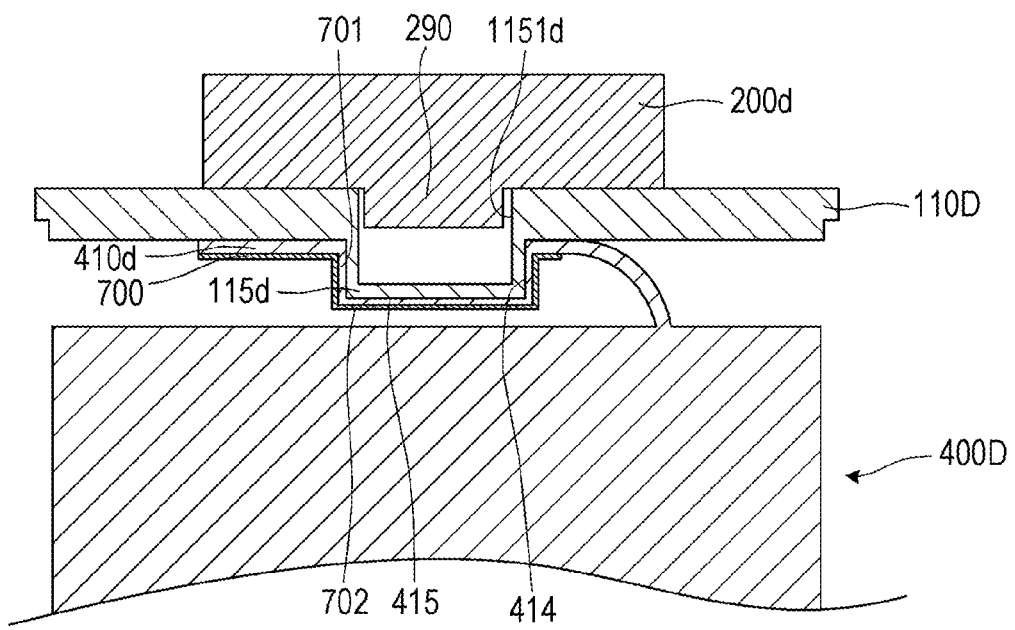
FIG. 10 is a cross-sectional view showing a joint structure between a lid body and a positive electrode tab portion of an electrode assembly according to a modification 5.

FIG. 10 is a cross-sectional view showing the joint structure between the lid body 110D and the positive electrode tab portion 410d of an electrode assembly 400D according to the modification 5. More specifically, FIG. 10 corresponds to FIG. 9.

As shown in FIG. 10, the reinforcing member 700 is made to overlap with a surface of the positive electrode tab portion 410d of the electrode assembly 400D on a side opposite to the lid body 110D. The reinforcing member 700 is joined to the positive electrode tab portion 410d and the lid body 110D by applying clinching to the reinforcing member 700 together with the positive electrode tab portion 410d and the lid body 110D. A material for forming the reinforcing member 700 is not particularly limited. However, the reinforcing member 700 may be formed of a metal member made of aluminum, an aluminum alloy or the like in the same manner as a positive electrode substrate layer of the electrode assembly 400D, for example.

A recessed portion 701 having a circular shape as viewed in a plan view into which the positive electrode tab portion 410d is fitted is formed on the reinforcing member 700. A protruding portion 702 is formed on the back side of the recessed portion 701. The recessed portion 701 and the protruding portion 702 have a relationship similar to a relationship between a front side and a back side of a coin. The recessed portion 701 and the protruding portion 702 do not communicate with each other. The recessed portion 701 and the protruding portion 702 form a swaged joint portion formed by making the reinforcing member 700 joined to the lid body 110D by clinching. Accordingly, before the reinforcing member 700 is joined to the lid body 110D by clinching, the recessed portion 701 and the protruding portion 702 are not formed on the reinforcing member 700. That is, in the modification 5, the swaged joint portion includes: a positive electrode bulging portion 115d and a recessed portion 1151d of the lid body 110D; a recessed portion 414 and a protruding portion 415 of the positive electrode tab portion 410d; and the recessed portion 701 and the protruding portion 702 of the reinforcing member 700.

As described above, the reinforcing member 700 is made to overlap with the positive electrode tab portion 410d, and is joined to the lid body 110D by clinching together with the positive electrode tab portion 410d and hence, the reinforcing member 700 protects the positive electrode tab portion 510d. Further, the reinforcing member 700 can suppress peeling off of a plate which forms a portion of the positive electrode tab portion 510d.

(Modification 6)

In the above-mentioned embodiment, the description has been made by exemplifying the case where the electrode assembly 400 which the energy storage device 10 includes is of a winding type. However, the energy storage device 10 may include a stacking-type electrode assembly where planar plates are stacked with each other, for example. Alternatively, the energy storage device 10 may include an electrode assembly having a structure where a plate having an elongated strip shape is stacked in bellows shape, for example.

Figure 11:
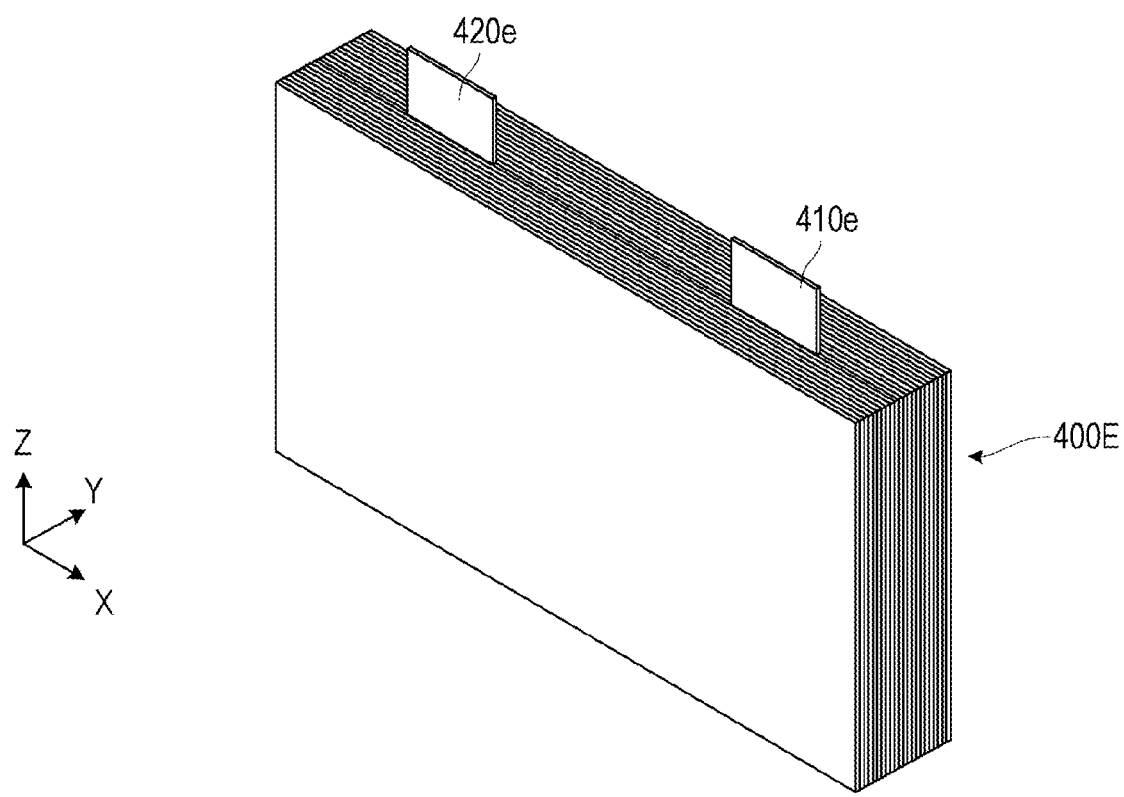
FIG. 11 is a perspective view showing a configuration of an electrode assembly according to a modification 6.

In this modification 6, a stacking-type electrode assembly 400E is described. FIG. 11 is a perspective view showing the configuration of the electrode assembly 400E according to the modification 6. As shown in FIG. 11, the electrode assembly 400E is formed such that positive electrode plates each forming a plate, negative electrode plates each forming a plate, and separators are arranged in layers such that each separator is sandwiched between the positive electrode plate and the negative electrode plate. A projecting portion is formed on respective positive electrodes, and a positive electrode tab portion 410e is formed by stacking these projecting portions. The positive electrode tab portion 410e is gathered toward the center in the stacking direction, for example. The positive electrode tab portion 410e is joined to the lid body 110D by clinching thus being electrically connected to the positive electrode terminal 200.

On the other hand, a projecting portion is also formed on respective negative electrodes, and a negative electrode tab portion 420e is formed by stacking these projecting portions. The negative electrode tab portion 420e is gathered toward the center in the stacking direction, for example. The negative electrode tab portion 420e is electrically connected to the negative electrode terminal 300 through the negative electrode current collector 140.

A stacking-type electrode assembly in bellows shape includes three types, i.e., (1) an electrode assembly in which an elongated strip shaped positive electrode, a negative electrode and separators are stacked and folded in bellows shape; (2) an electrode assembly in which one of positive and negative electrodes having an elongated strip shape and elongated strip shaped separators are stacked and folded in bellows shape and the other of positive and negative electrodes is inserted therein; and (3) an electrode assembly in which an elongated strip shaped separator is folded in bellows shape and positive electrodes and negative electrodes are inserted therein.

Figure 12:
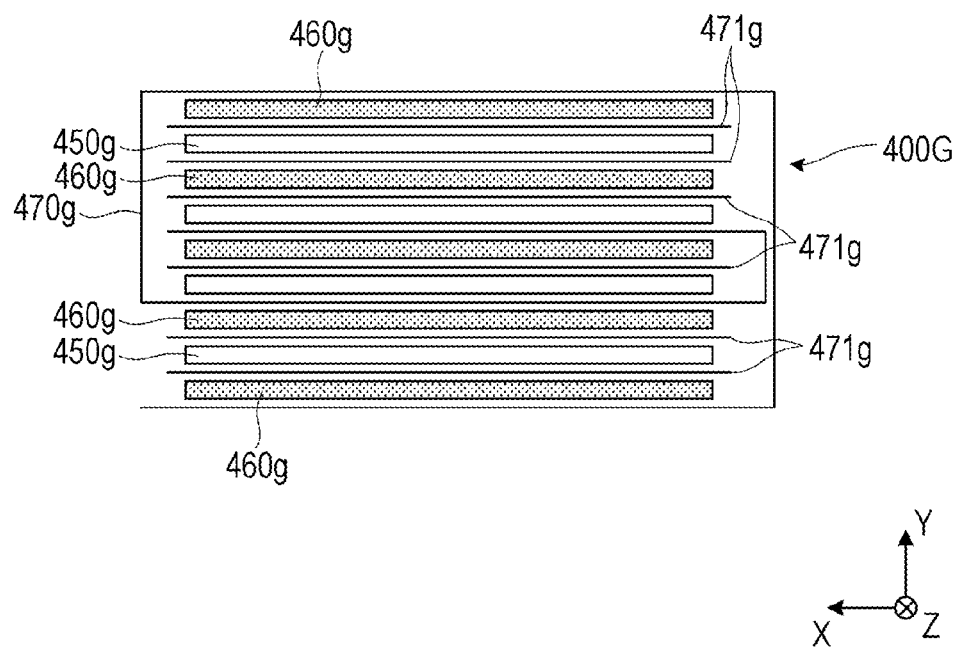
FIG. 12 is a schematic view showing another example of the electrode assembly according to the modification 6.
Figure 13:
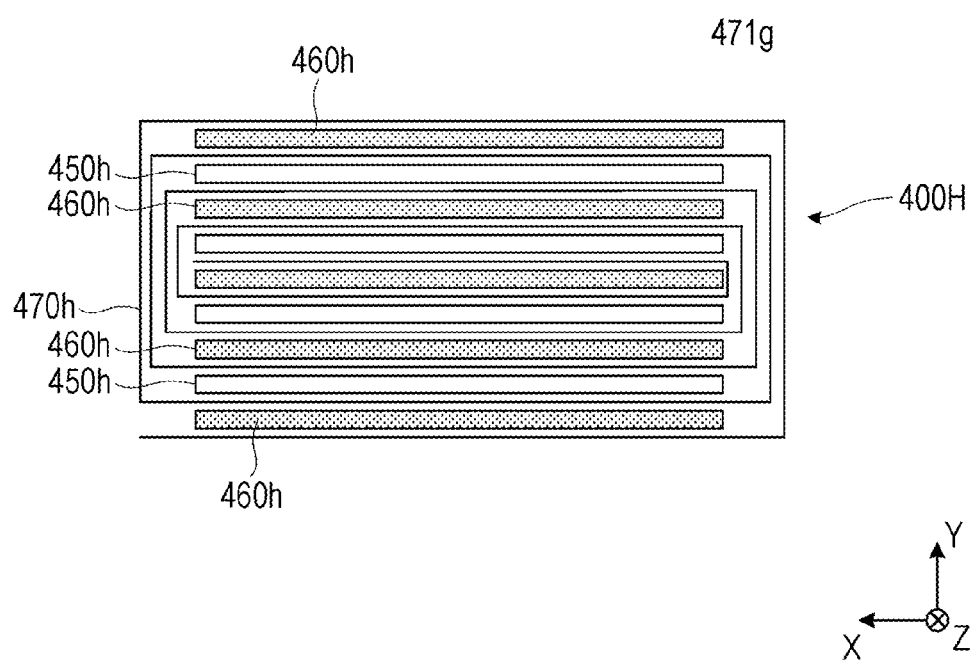
FIG. 13 is a schematic view showing still another example of the electrode assembly according to the modification 6.

A stacking-type electrode assembly other than the bellows shape may be configured as shown in FIGS. 12 and 13. FIGS. 12 and 13 schematically depict bottom views of electrode assemblies 400G and 400H.

As shown in FIG. 12, the electrode assembly 400G includes positive electrodes 450g and negative electrodes 460g alternately stacked. Between each of the positive electrodes 450g and negative electrodes 460g, separators 470g and 471g are interposed. The separator 470g is wound while sandwiching predetermined number of positive and negative electrodes, wrapping the outermost positive and negative electrodes 450g and 460g. The separator 470g is inserted between the positive electrode 450g and the negative electrode 460g at substantially central position. Each of the separators 471g is inserted between the positive electrode 450g and the negative electrode 460g where the separator 470g is not disposed. The electrode assembly 400G as a whole has a stacking configuration. In this example, the separator 470g is wrapped once with respect to the outermost positive and negative electrodes 450g and 460g; however the separator 470g may wrap them plural times. The separator 470g may further be inserted between positive and negative electrodes 450g and 460g not shown in the drawing.

As shown in FIG. 13, the electrode assembly 400H includes positive electrodes 450h and negative electrodes 460h alternately stacked. An elongated shaped separator 470h is interposed between each of the positive electrodes 450h and negative electrodes 460h. One end of the separator 470h is inserted between the positive electrode 450h and the negative electrode 460h at substantially central position, and the separator 470h is inserted between the remaining positive and negative electrodes 450h and 460h, and is wrapped around the outermost positive and negative electrodes 450h and 460h. The electrode assembly 400H as a whole has a stacking configuration.

(Modification 7)

In the above-mentioned modification 6, the case has been exemplified where the positive-electrode-side tab portion to which the clinching is applied is formed of one positive electrode tab portion 410e. However, when the number of stacked projecting portions in the tab portion is excessively large, there may be a case where certainty of clinching is lowered. Accordingly, it may be also possible to adopt the structure where the positive-electrode-side tab portion to which the clinching is applied is divided into a plurality of portions, and the clinching is applied individually to the respective divided portions so as to increase certainty of the clinching. In the modification 7, the description is made by exemplifying a case where two positive-electrode-side tab portions are provided. In the description made hereinafter, parts identical with the parts in the above-mentioned modification 6 are given the same symbols, and the description of such parts may be omitted.

Figure 14:
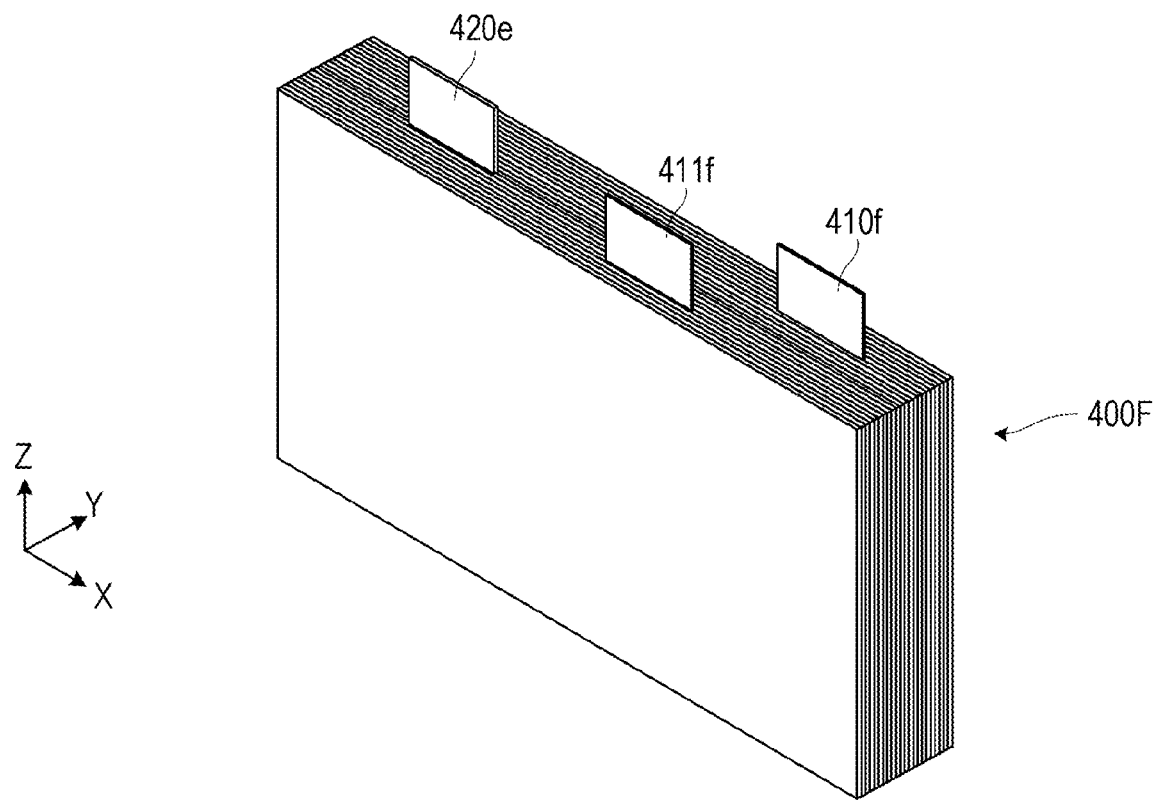
FIG. 14 is a perspective view showing a configuration of an electrode assembly according to a modification 7.

FIG. 14 is a perspective view showing the configuration of an electrode assembly 400F according to the modification 7. As shown in FIG. 14, in the electrode assembly 400F, two positive electrode tab portions 410f, 411f are arranged with a predetermined distance therebetween in the X axis direction. The positive electrode tab portions 410f, 411f are joined to the lid body 110D by clinching thus being electrically connected to the positive electrode terminal 200.

Methods of forming two positive electrode tab portions 410f, 411f are described by focusing only on positive electrodes while ignoring negative electrodes and separators. A plurality of positive electrodes forming the electrode assembly 400F are formed of: a plurality of first positive electrodes respectively having a first projecting portion and forming the positive electrode tab portion 410f; and a plurality of second positive electrodes respectively having a second projecting portion and forming the positive electrode tab portion 411f.

A first forming method is a method where the plurality of first positive electrodes are continuously stacked so that the respective first projecting portions are stacked with each other thus forming the positive electrode tab portion 410f, and the plurality of second positive electrodes are continuously stacked so that the respective second projecting portions are stacked with each other thus forming the positive electrode tab portion 411f.

A second forming method is a method where the first positive electrode and the second positive electrode are alternately stacked with each other such that the respective first projecting portions are stacked with each other thus forming the positive electrode tab portion 410f and, at the same time, the respective second projecting portions are stacked with each other thus forming the positive electrode tab portion 411f. Two positive electrode tab portions 410f, 411f may be formed by suitably adopting either one of the first forming method or the second forming method.

Also with respect to the stacking-type electrode assemblies 400E, 400F exemplified in the modifications 6 and 7, the positive electrode tab portions 410e, 410f, 411f may be joined to a positive electrode current collector by welding or the like, and the positive electrode current collector and a lid body may be joined to each other by clinching.

(Other Modifications)

The number of electrode assemblies 400 which the energy storage device 10 includes is not limited to one, and may be two or more.

The positional relationship between the positive electrode tab portion 410 and the negative electrode tab portion 420 which the electrode assembly 400 has is not particularly limited. For example, in the winding-type electrode assembly 400, the positive electrode tab portion 410 and the negative electrode tab portion 420 may be disposed on sides opposite to each other in the direction of the winding axis. When the energy storage device 10 includes a stacking-type electrode assembly, as viewed in the stacking direction, the positive electrode tab portion and the negative electrode tab portion may be formed so as to project in different directions. In this case, it is sufficient that the positive electrode current collector be disposed at the position which corresponds to the positive electrode tab portion, and the negative electrode current collector, the negative electrode sealing member and the like be disposed at the position which corresponds to the negative electrode tab portion.

In the above-mentioned embodiment, the description has been made by exemplifying the case where the container 100 has a positive potential. However, the container may have a negative potential. In this case, the negative electrode tab portion or the negative electrode current collector and the container are joined to each other by clinching. On the positive electrode side, an insulating sealing member is disposed between the positive electrode terminal or the positive electrode current collector and the container.

In the above-mentioned embodiment, the description has been made by exemplifying the case where the second joint portions 160, 270 are connected to the tab portions (the positive electrode tab portion 410, the negative electrode tab portion 420) of the electrode assembly 400 by welding. However, the second joint portions and the tab portions may be joined to each other by clinching.

In the above-mentioned embodiment, the description has been made by exemplifying the case where clinching is applied to the lid body 110 of the container 100. However, clinching may be also applied to the body 111 of the container 100 in place of the lid body 110.

Configurations which are acquired by combining the above-mentioned embodiment and the above-mentioned modifications as desired are also included in the scope of the present invention.

The present invention is applicable to an energy storage device such as a lithium ion secondary battery.

What is claimed is:

1. An energy storage device, comprising:
an electrode assembly including a body portion and a first tab portion projecting from the body portion; and
a container housing the electrode assembly,
wherein a first current collector electrically connected to the first tab portion and the container, or the first tab portion and the container, include a swaged joint portion including a concavo-convex structure projecting toward an other side from one side in a first direction, and
wherein a member selected from the group consisting of the container, the first current collector, and the first tab portion, in which the member is disposed inside the concavo-convex structure, includes an expanding portion which projects in a second direction intersecting with the first direction.

2. The energy storage device according to claim 1, wherein the electrode assembly further includes a second tab portion projecting from the body portion, and
wherein the energy storage device further comprises:
the first current collector;
a second current collector electrically connected to the second tab portion;
a conductive member mounted on the container and electrically connected to the first tab portion through the first current collector;
a second terminal mounted on the container, penetrating the container, and electrically connected to the second tab portion through the second current collector; and
an insulating sealing member disposed between the second terminal or the second current collector and the container.

3. The energy storage device according to claim 2, wherein the first tab portion, the conductive member, and the first current collector have positive polarity, and
wherein the second tab portion, the second terminal, and the second current collector have negative polarity.

4. The energy storage device according to claim 2, wherein the swaged joint portion of the container forms a first terminal, and
wherein the conductive member includes a bus bar connected to the first terminal.

5. The energy storage device according to claim 2, wherein the conductive member is positioned with respect to the swaged joint portion of the container.

6. The energy storage device according to claim 1, wherein the first current collector and the container include the swaged joint portion.

7. The energy storage device according to claim 1, wherein the first tab portion and the container include the swaged joint portion.

8. The energy storage device according to claim 1, wherein the member includes the container that is disposed inside the concavo-convex structure.

9. The energy storage device according to claim 1, wherein the member includes the first current collector that is disposed inside the concavo-convex structure.

10. The energy storage device according to claim 1, wherein the member includes the first tab portion that is disposed inside the concavo-convex structure.

11. The energy storage device according to claim 1, wherein the first tab portion projects from the body portion toward the swaged joint portion.

12. The energy storage device according to claim 2, wherein the insulating sealing member is disposed between the second terminal and the container.

13. The energy storage device according to claim 2, wherein the insulating sealing member is disposed between the second current collector and the container.

14. An energy storage device, comprising:
an electrode assembly including a body portion and a tab portion projecting from the body portion; and
a container housing the electrode assembly,
wherein a current collector electrically connected to the tab portion and the container, or the tab portion and the container, include a swaged joint portion including a concave-convex structure projecting toward an other side from one side, and
wherein the tab portion projects from the body portion toward the swaged joint portion,
wherein one of the container, the current collector, and the tab portion is disposed inside the concavo-convex structure,
wherein the concavo-convex structure projects toward the other side from the one side in a first direction, and
wherein said one of the container, the current collector, and the tab portion includes an expanding portion which projects in a second direction intersecting with the first direction.

15. The energy storage device according to claim 14, wherein the current collector and the container include the swaged joint portion.

16. The energy storage device according to claim 14, wherein the tab portion and the container include the swaged joint portion.

* * * * *